June 9, 1925.  1,541,773
F. W. STEWART
MEANS FOR LOCKING AUTOMOBILES AGAINST THEFT
Filed Feb. 27, 1924
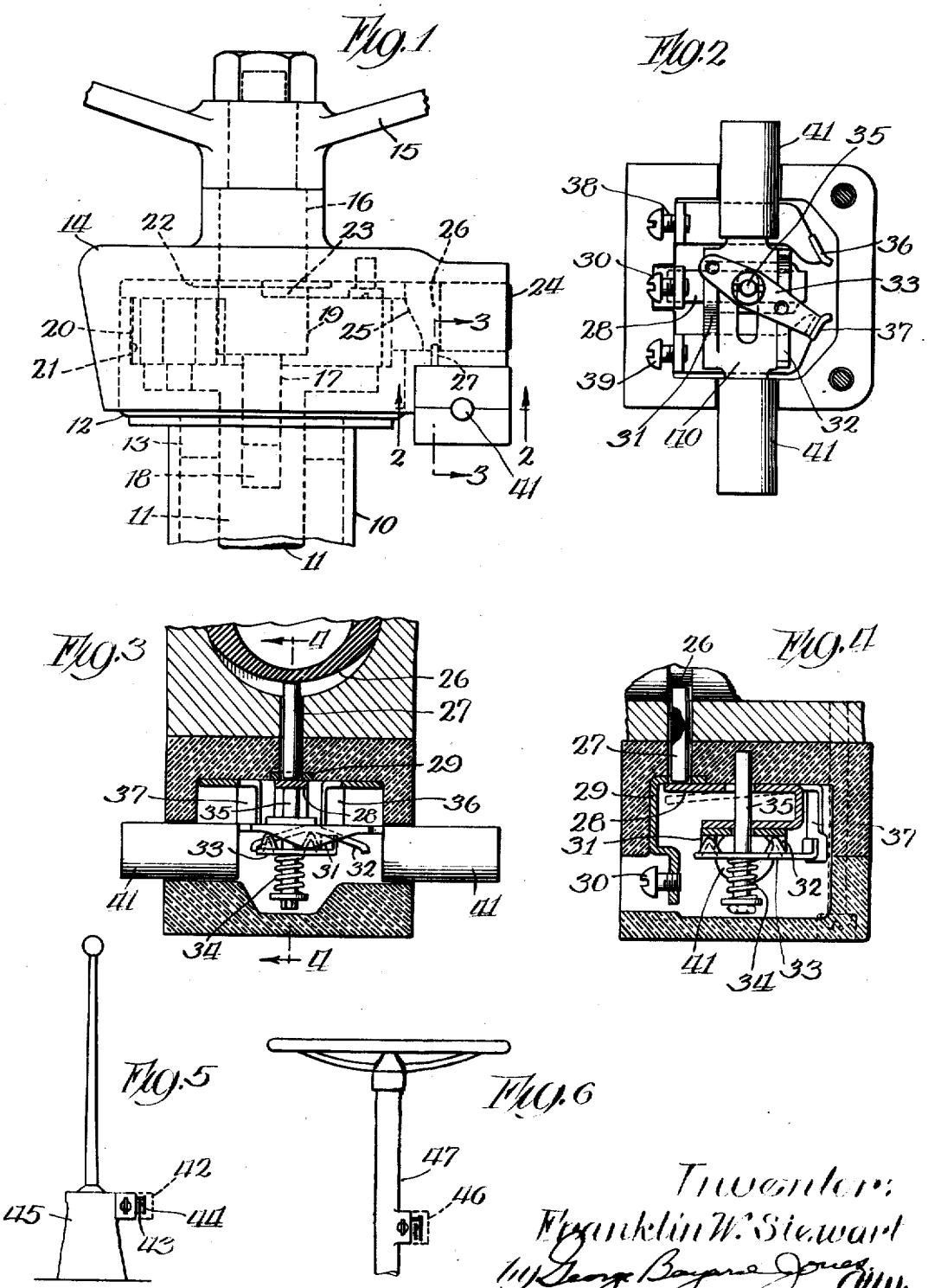
Inventor:
Franklin W. Stewart Patented June 9, 1925.

1,541,773

UNITED STATES PATENT OFFICE.

FRANKLIN W. STEWART, OF CHICAGO, ILLINOIS.

MEANS FOR LOCKING AUTOMOBILES AGAINST THEFT.

Application filed February 27, 1924. Serial No. 695,614.

*To all whom it may concern:*

Be it known that I, FRANKLIN W. STEWART, a citizen of the United States, residing at Chicago, in the county of Cook and State of Illinois, have invented certain new and useful Improvements in Means for Locking Automobiles Against Theft, of which the following is a specification.

My invention relates to improvements in means for locking automobiles against theft. More specifically it relates to an improved device for locking some part of the automobile, such as the steering wheel or gear shift lever to render the same inoperative and simultaneously opening the ignition circuit.

Locks for this general purpose have been proposed heretofore, but some of them are objectionable as they require two operations, one the turning of the key and the other the moving of some locking part, whereas others are objectionable in that the switch structure is combined with the rest of the locking device in such a way as to render the switch inaccessible in case of repairs or replacement.

One object of my invention is to overcome these difficulties by providing a device wherein the simple actuation of the key results in locking the vehicle and simultaneously opening the ignition circuit, either battery or magneto.

Another object is to provide an improved construction wherein a switch of standard form may be readily applied to the housing containing the lock and be actuated by a pin passing through the wall of said housing whereby said switch is readily accessible.

A further object is to provide a simple lock of this character which can be applied to the planetary gear type of lock with practically no change therein other than a substitution of one cover for another without requiring the services of a skilled mechanic.

The embodiment of the invention shown in the drawings is adapted for steering wheels of the planetary gear type, steering post lock type, and gear shift lock type, although I do not limit myself to these types, as the invention is applicable to all existing types of locks.

Fig. 1 is a side elevation of the device.

Fig. 2 is an enlarged view, on line 2—2, Fig. 1, of the switch mechanism.

Fig. 3 is a section on line 3—3, Fig. 1.

Fig. 4 is a section on line 4—4, Fig. 3.

Fig. 5 is an elevation showing the lock applied to a gear shift lever, and

Fig. 6 is an elevation of a steering post lock.

The steering wheel mechanism may comprise the well-known tubular housing 10 which encloses the steering post 11, with the planetary gear housing 12 arranged at the upper end thereof and having a depending flange 13 which fits the correspondingly shaped opening in said tubular housing and which has a circular central opening providing a bearing for the upper end of steering wheel post 11.

A cap 14 is screw-threaded over the housing 12 in the usual manner. Above the cap the steering wheel 15 is mounted on a short shaft 16, the latter having a reduced extension 17 which fits within a central opening 18 in post 11. The sun gear 19 is mounted on the shaft 16 to turn therewith, and meshes with the planetary gears 20, which in turn mesh with the annular gear 21 formed in the circular wall of the housing 12.

A ratchet 22 and pivoted pawl 23 cooperate to lock the wheel against rotation in one direction, in substantially the manner described also in my copending application 679,089 filed December 7, 1923.

The lock 24 may be of the cylindrical type and has a cam surface 25 at its inner end for controlling the ratchet, and a peripheral cam surface 26 arranged to move an insulating pin 27 outwardly, as shown in Fig. 3. Said movement lifts a spring contact 28 from a contact member 29 thereby opening the ignition circuit, a terminal of which is shown at 30.

The other elements of the switch proper are of a well known hill and valley type comprising a convex member 31 and a concave member 32 engaged by a third member 33 which is held against them by a spring 34 causing said third member to snap back and forth about a central pin 35, thereby opening and closing either of two circuits having switch terminals 36, 37 and corresponding terminals 38, 39. The hill and valley members 31 and 32 comprise a part of a reciprocating plate 40 actuated by push-buttons 41.

It will be seen that the switch, which is complete in itself, may readily be applied to the housing and may be removed and taken apart in case repairs are necessary;—the ready removal of said switch effecting in no way the efficiency of the lock. Since the switch is actuated simply by a pin of insulating material or some other member having means for providing an insulated connection between the switch and the lock, it may be applied to any locking device on which a cam surface may be provided. It will also be seen that the actuation of the key operates the locking device and also operates the circuit opening switch without requiring an additional movement or operation by the driver. Although a key actuating lock is disclosed, it is apparent that a combination lock or other type of lock may be used. Furthermore, any other locking device may be used, the movement of which actuates said pin to control the ignition circuit or other circuit. Although the switch in the drawings is shown mounted beneath the portion of the housing which contains the lock, said switch may, of course, be mounted at the side, or in any other convenient relation to said housing and associated parts.

Fig. 5 shows, somewhat diagrammatically a switch 42 having separable contacts 43 and 44 applied to a gear shift lever locking housing 45. Fig. 6 shows a switch 46 applied to a sterring wheel post 47.

One of the advantages of my improved combination lock is that the driver is practically compelled to lock his car before leaving it. He must turn a key to operate a switch, in any case, in order to stop the engine, and with the construction described herein the same operation which stops the engine necessarily locks the car. The possibility of the driver neglecting to lock his car is therefore eliminated. Furthermore, the turning of said key necessarily opens the ignition circuit so that the car is locked, both mechanically and electrically. An additional advantage is that in order to start the car, the driver is necessarily compelled to start the engine first, and by so doing he simultaneously unlocks whatever part of the car is locked to prevent theft. With prior devices, drivers frequently have started the engine and then started to drive the car, forgetting that the steering wheel, for example, was inoperative, resulting in accidents due to the fact that the driver had no control over the moving car. An additional advantage is that the switch may be readily applied to any one of the three well-known types of locks, wheel locks, steering post locks and gear shift locks, as well as other locks, and is actuated merely by a pin passing through an opening in the housing of the lock whether the lock is of a rotating or reciprocating type. The only addition required to standard locks to accomplish this purpose is a cam or other simple means for actuating the pin.

The device is readily applied to a car of the type described, as it is necessary merely to remove the steering wheel and unscrew the cover of the planetary gear housing, after which the improved device may be screwed into place as a substitute for the original cover. Either the same steering wheel or a special steering wheel may be used as part of the equipment. The substituted part cannot be stolen as it is locked against rotation in a direction to unscrew it, by the pawl and ratchet, except when the key is inserted and the parts are unlocked by the owner, whereby the entire upper structure may be removed for inspection, oiling, etc.

What I claim is:

1. In a device of the class described, a housing having a locking element, a two-circuit snap-switch which maintains one of said circuits closed, having no neutral position, said switch being accessible to the operator, and a member coacting with said switch and said locking element whereby either circuit is opened or closed automatically during the actuation of said locking member.

2. In a device of the class described, a housing and a lock therein, a part actuated by said lock to prevent theft of the vehicle, an electric switch having no neutral point and having two circuits accessible to the operator, and a member directly cooperating with said lock and said switch, said switch being controlled by said member.

3. In a device of the class described, a housing having a lock therein with a rotatable barrel, a part actuated by the rotation of said barrel to prevent theft of the vehicle, a quick snap over electric switch carried by said housing independently of said lock and being in circuit with the battery and the magneto of the vehicle, either of which circuits may be selectively employed, and a member actuated by said barrel for making or breaking either of said circuits.

4. In combination, coacting members for locking a vehicle, a manually actuated lock having a rotatable barrel controlling the coaction of said members, a quick snap-over switch with two complete ignition circuits both of which are under the control of the operator and having circuit opening contacts, and a pin actuated by said rotatable barrel to regulate said circuit opening contacts whereby said ignition circuits and said vehicle lock are controlled directly by said barrel.

5. The combination with a steering wheel having a pawl and ratchet locking mechanism, of a lock controlling said pawl, a switch having two circuits, one of which is always closed, and a circuit breaking member controlled by said lock.

6. The combination with a steering wheel having a locking-mechanism, of a lock controlling said mechanism, a switch having two circuits, said switch being always in closed relation with reference to one of said circuits, and a member actuatable by said lock to break said closed circuit.

7. The combination with a steering wheel lock having a rotatable barrel with a peripheral cam thereon, of a quick snap-over ignition switch adapted to close either of two ignition circuits, and means actuated by said cam for rendering both ignition circuits ineffective when said barrel is rotated.

8. A locking attachment for a steering wheel of the planetary gear reduction type comprising a metal housing, an insulating member mounted thereon, a battery and ignition switch supported by said insulating member, a pin extending from said switch through an opening in said housing, and a lock mounted on said housing for locking the steering wheel and for moving said pin to render either battery or ignition circuit ineffective.

9. The combination with a steering wheel mechanism, of a lock therefor, a switch mounted thereon having circuit closing contacts, a pair of auxiliary closing contacts normally in engagement, and a pin insulated and actuated by the operation of the lock, and mechanism for separating said auxiliary contacts.

10. The combination with a vehicle locking device, of a key actuated lock therefor, an independent quick snap-over switch without a neutral point, accessible to the operator, said switch being mounted adjacent said lock, and a pin extending from said lock to said switch to open the circuit of the latter whereby both said vehicle lock and said switch are actuated directly by the manual operation of said key.

11. In a device of the class described, a housing having a locking element, a circuit controlling member always in operative position with reference to one of two available circuits, and an inaccessible actuating member controlled entirely by the manual operation of said locking element, said actuating member being arranged to open both said circuits independently of said circuit controlling member when said locking element is moved to locking position.

12. In a device of the class described, a housing having a locking element, two circuits associated therewith, a member actuable simultaneously with the actuation of said locking element to unlocking position for rendering said circuits available for ignition purposes, and a circuit controlling member movable only from one circuit to the other for selectively closing said circuits.

13. In a device of the class described, a locking element, two circuits associated therewith, a two-way switch adapted for a quick snap-over between said two circuits, and an actuating member controlled by the actuation of said locking element for opening both said circuits.

14. In a device of the class described, a housing, a locking mechanism therein, two circuits associated therewith having a switch in common, one of said circuits being always closed by said switch when said locking mechanism is in unlocked relation, a cam on a movable part of said lock, and a pin actuated by said cam to make and break the circuit closed by said switch.

15. In a self-propelled vehicle, in combination, a rotatable cylindrical lock, an actuating member mounted to turn with said cylindrical lock, a double ignition circuit having a switch with a quick snap-over action making either circuit accessible and with no circuit opening position, and means controlled by said actuating member for breaking either circuit.

16. In combination with a quick snap-over switch, auxiliary electrical circuit-closing contacts, and an insulated member associated with said auxiliary circuit contacts whereby said auxiliary circuit is opened and closed by the movement of said member.

17. In combination with a quick snap-over switch having circuit closing contacts, a pair of auxiliary circuit closing contacts normally in engagement, an insulating member, and means for actuating said member for operating said auxiliary contacts.

18. In combination with a quick snap-over switch having circuit closing contacts, a pair of auxiliary circuit closing contacts normally in engagement, a lock having a casing, a cam arranged on the moving part of said lock, and a member insulated from and actuated by said cam for separating said contacts.

19. The combination with a cylindrical lock having a casing, of a quick snap-over ignition switch having a casing, a cam associated with said lock in contact with an insulated member supported partly by the lock casing and partly by the switch casing whereby the turning of the lock actuates the member to break the ignition circuit.

20. The combination of an ignition switch having contacts for two circuits, the contacts of one circuit or the other being always in engagement to close the respective circuit, a locking mechanism, and a member moved thereby to open the ignition circuit closed by said engaging contacts.

21. The combination of a switch always in closing position with reference to one or the other of two circuits, said switch having a housing, a locking element having a housing, and a member supported by and insulated and completely enclosed within the housings of said switch and said locking element in such a manner that said member may be actuated only by mechanical movement incidental to the operation of said locking element.

22. The combination of a switch having contacts for two circuits, the contacts of one or the other of said circuits being always in engagement, a locking element, and a pin associated with said locking element but insulated therefrom, said pin being actuated by said locking element in such a manner as to give the pin a longitudinal movement to make and break selectively the circuit of said engaging contacts.

23. The combination with a lock, of a quick snap-over switch having contacts controlling more than one circuit, said switch including relatively movable elements, one of which has a hill and valley surface, a pin in contact with the locking element and actuated by the mechanical movement incidental to the operation of said lock, thereby making and breaking one of the circuits of said switch.

In testimony whereof, I have subscribed my name.

FRANKLIN W. STEWART.

closing position with reference to one or the other of two circuits, said switch having a housing, a locking element having a housing, and a member supported by and insulated and completely enclosed within the housings of said switch and said locking element in such a manner that said member may be actuated only by mechanical movement incidental to the operation of said locking element.

22. The combination of a switch having contacts for two circuits, the contacts of one or the other of said circuits being always in engagement, a locking element, and a pin associated with said locking element but insulated therefrom, said pin being actuated by said locking element in such a manner as to give the pin a longitudinal movement to make and break selectively the circuit of said engaging contacts.

23. The combination with a lock, of a quick snap-over switch having contacts controlling more than one circuit, said switch including relatively movable elements, one of which has a hill and valley surface, a pin in contact with the locking element and actuated by the mechanical movement incidental to the operation of said lock, thereby making and breaking one of the circuits of said switch.

In testimony whereof, I have subscribed my name.

FRANKLIN W. STEWART.

DISCLAIMER.

1,541,773.—*Franklin W. Stewart*, Chicago, Ill. MEANS FOR LOCKING AUTOMOBILES AGAINST THEFT. Patent dated June 9, 1925. Disclaimer filed October 7, 1927, by the patentee.

Hereby enters this disclaimer of said claims which read as follows:

"16. In combination with a quick snap-over switch, auxiliary electrical circuit-closing contacts, and an insulated member associated with said auxiliary circuit contacts whereby said auxiliary circuit is opened and closed by the movement of said member."

"20. The combination of an ignition switch having contacts for two circuits, the contacts of one circuit or the other being always in engagement to close the respective circuit, a locking mechanism, and a member moved thereby to open the ignition circuit closed by said engaging contacts."

[*Official Gazette October 25, 1927.*]

DISCLAIMER.

1,541,773.—*Franklin W. Stewart*, Chicago, Ill. MEANS FOR LOCKING AUTOMOBILES AGAINST THEFT. Patent dated June 9, 1925. Disclaimer filed October 7, 1927, by the patentee.

Hereby enters this disclaimer of said claims which read as follows:

"16. In combination with a quick snap-over switch, auxiliary electrical circuit-closing contacts, and an insulated member associated with said auxiliary circuit contacts whereby said auxiliary circuit is opened and closed by the movement of said member."

"20. The combination of an ignition switch having contacts for two circuits, the contacts of one circuit or the other being always in engagement to close the respective circuit, a locking mechanism, and a member moved thereby to open the ignition circuit closed by said engaging contacts."

[*Official Gazette October 25, 1927.*]